UNITED STATES PATENT OFFICE.

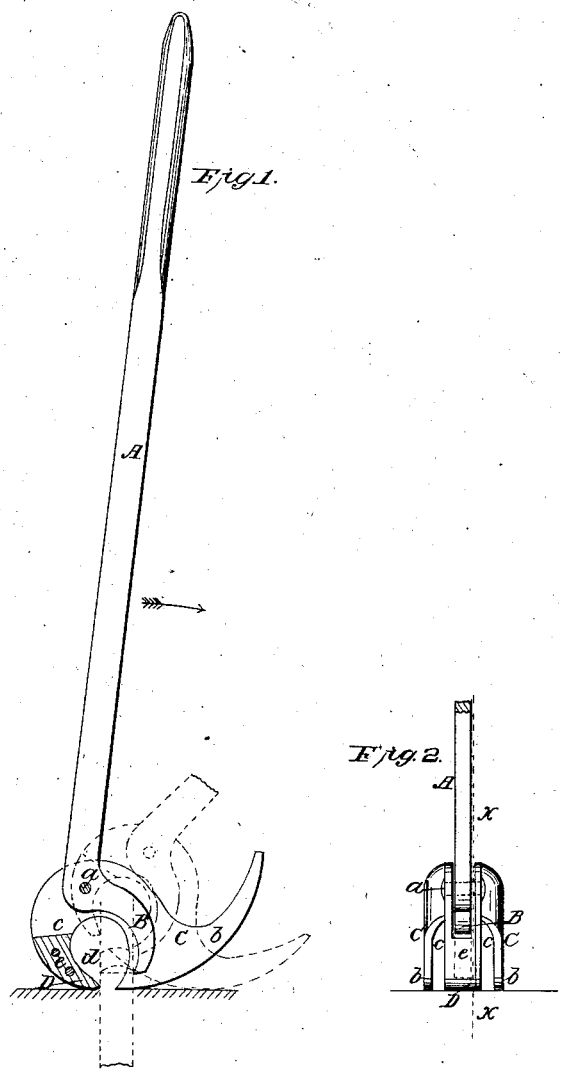

GEORGE STONE, OF BOSTON, MASSACHUSETTS.

TOOL FOR DRAWING SPIKES.

Specification forming part of Letters Patent No. 46,154, dated January 31, 1865.

*To all whom it may concern:*

Be it known that I, GEORGE STONE, of Boston, in the county of Suffolk and State of Massachusetts, have invented a new and Improved Implement or Device for Drawing Spikes; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\,x$, Fig. 2; Fig. 2 a back view of the lower and principal portion of the same.

Similar letters of reference indicate like parts.

This invention relates to a new and improved implement or device for drawing spikes, large nails, pins, &c.; and it consists in the employment or use of a handle or lever, the lower end of which is provided or formed with a jaw of curved form, the handle or lever at its junction with the jaw being secured by a pivot-bolt between two rocker-shaped fulcra, which are connected at one end and so constructed as to form a jaw, all being arranged in such a manner as to admit of spikes, nails, &c, being drawn with the greatest facility.

A represents a handle or lever, which may be of any required length, and is provided at its lower end with a jaw, B, which is of curved form, approximating to a semi-circle, as shown clearly in Fig. 1.

C C represent two rocker-shaped fulcra, between which the lower part of the handle or lever A, at its junction with the jaw B, is secured by a pivot-bolt, $a$. The rocker portion of the fulcra C C is designated by $b$, and the other parts, $c$, are curved in semicircular form with a curved opening or space, $d$, between them and $b$, so that the parts $c$ form a jaw, D, corresponding with and constituting the fellow of the jaw B, the latter being curved in a reverse direction to the former, as shown clearly in Fig. 1. The two parts $c\,c$ have a plate or block, $e$, riveted between them, so as to form a solid jaw.

The implement is used by adjusting the handle or lever A so that the jaw B will be moved out from the other jaw, D, and the implement is so adjusted to the spike or other article to be drawn that the jaws B and D will be at opposite sides of it. The handle or lever A is then moved in the direction indicated by the arrow, Fig. 1, and the jaws grip the spike and by bearing down upon the handle or lever the spike will be drawn, the rockers $b$ serving as a rolling fulcra and admitting of the easy drawing of the spike.

The whole arrangement is extremely simple and efficient, and it may be manufactured at a reasonable cost.

I claim as new and desire to secure by Letters Patent—

The handle or lever A, formed or provided with the jaw B, in connection with the rocker-shaped fulcra C C, provided with the jaw D, and having the handle or lever secured between them by a pivot-bolt, substantially as and for the purpose herein set forth.

GEORGE STONE.

Witnesses:
HIRAM WELLINGTON,
LEMUEL GARDNER.